(12) United States Patent
DiSabatino

(10) Patent No.: US 7,237,584 B2
(45) Date of Patent: Jul. 3, 2007

(54) BUTT PLATE FOR FELLER BUNCHER

(75) Inventor: Benjamin DiSabatino, Brantford (CA)

(73) Assignee: Timberjack, Inc., Moline, IL (US)

( * ) Notice: Subject to any disclaimer, the term of this patent is extended or adjusted under 35 U.S.C. 154(b) by 187 days.

(21) Appl. No.: 10/839,527

(22) Filed: May 5, 2004

(65) Prior Publication Data

US 2004/0221921 A1 Nov. 11, 2004

Related U.S. Application Data

(60) Provisional application No. 60/467,980, filed on May 5, 2003.

(51) Int. Cl.
*A01G 23/08* (2006.01)

(52) U.S. Cl. ............... 144/4.1; 144/34.1; 144/3.1; 83/928

(58) Field of Classification Search ............... 144/34.1, 144/4.1, 335, 336, 2.1, 3.1; 83/928
See application file for complete search history.

(56) References Cited

U.S. PATENT DOCUMENTS

| | | | |
|---|---|---|---|
| 3,468,352 A * | 9/1969 | Jam et al. ............... | 144/34.1 |
| 3,910,326 A | 10/1975 | Tucek | |
| 4,161,200 A * | 7/1979 | Albright ............... | 144/34.1 |
| 4,221,245 A * | 9/1980 | Wildey ............... | 144/34.1 |
| 4,281,693 A * | 8/1981 | Moulson ............... | 144/34.1 |
| 4,446,897 A | 5/1984 | Kurelek | |
| 4,653,555 A | 3/1987 | Mellgren | |
| 4,690,185 A * | 9/1987 | Hamilton et al. ............... | 144/34.1 |
| 4,727,916 A | 3/1988 | Sigouin | |
| 4,909,291 A | 3/1990 | Tremblay | |
| 4,987,935 A | 1/1991 | Corcoran et al. | |
| 5,004,026 A * | 4/1991 | MacLennan et al. ............... | 144/4.1 |
| 5,109,900 A | 5/1992 | Gilbert | |
| 5,113,919 A * | 5/1992 | MacLennan ............... | 144/34.1 |
| 5,303,752 A | 4/1994 | MacLennan | |
| 5,377,731 A | 1/1995 | Wildey | |
| 5,697,412 A | 12/1997 | Kurelek | |
| 5,794,674 A * | 8/1998 | Kurelek ............... | 144/34.1 |
| 5,816,299 A * | 10/1998 | Mathews et al. ............... | 144/34.1 |
| 5,931,210 A | 8/1999 | Kurelek | |
| 6,068,035 A * | 5/2000 | DiSabatino et al. ............... | 144/34.1 |
| 6,152,201 A | 11/2000 | Kurelek | |
| 6,173,973 B1 | 1/2001 | Robinson | |
| 6,640,850 B1 * | 11/2003 | Hicks ............... | 144/4.1 |

OTHER PUBLICATIONS

Cameco R20B Shear for the John Deere 643G Feller Buncher, Aug. 2000.
Cameco G22B High Speed Bunching Saw for the John Deere 843G and 643G Feller Buncher, 2000.

* cited by examiner

Primary Examiner—Bena Miller
(74) Attorney, Agent, or Firm—Quarles & Brady LLP

(57) ABSTRACT

A butt plate for a felling head includes a ramped portion in an accumulation pocket. The ramped portion is sloped downward generally toward a line extending in the direction of forward travel of the head. The butt plate allows for high accumulation of trees while retaining stable bunches.

16 Claims, 17 Drawing Sheets

BUTT PLATE FOR FELLER BUNCHER

CROSS-REFERENCE TO RELATED APPLICATION

This application claims the benefit of provisional application Serial No. 60/467,980 filed May 5, 2003, entitled "Butt Plate for Feller Buncher", hereby incorporated by reference.

BACKGROUND OF THE INVENTION

1. Field of the Invention

This invention relates to forestry equipment, and in particular to a butt plate for a feller buncher for felling and accumulating trees.

2. Discussion of the Prior Art

Felling heads are widely used in the logging industry for accumulating several freshly cut trees in a vertical position prior to laying down the bundle at once, to be transported to roadside by a skidder or forwarder. The felling head is mounted to a heavy duty vehicle, such as a drive to tree or swing to tree wheeled or tracked vehicle, for high efficiency logging.

One type of felling head uses a large saw blade disc having peripheral cutting teeth. The disc is rotated in a horizontal plane below a butt plate, with the teeth exposed at the front of the butt plate. As successive trees are cut, harvesting arms are actuated to pull the tree into an accumulation pocket while at the same time an accumulation arm is withdrawn from the accumulation pocket and then moved behind or brought around the bundle of accumulated trees to add the newly cut tree to the bundle. See, for example, the prior art felling head 10 which is illustrated in FIG. 1.

In FIG. 1, a conventional butt plate 4 is provided over a disc saw 2 operated by a motor 11. In this configuration, the butt plate 4 must be dimensioned to be smaller than the saw radius, limiting the size of the tree accumulation pocket to the small storage area 5 on the butt plate 4 itself. With this arrangement, trees can only be pushed rearwardly to a limited degree, and there is little space for tree storage, and essentially no space for a separate accumulation area, thereby limiting both the size and number of trees which can be accumulated.

Because of these restrictions, various high accumulation butt plates have been developed. For example, butt plates have been developed to include angled ramps which extend over the saw blade to a plateau which provides a larger accumulation pocket, allowing for the accumulation of a larger number of trees and trees of a bigger size. Referring to FIGS. 2 and 3, here a ramp 6 is provided between the butt plate 4 and a substantially flat accumulation area 5. The ramp 6 and accumulation area extend radially from an outer edge of the disc saw 2 toward the motor 11 at the center of the saw 2. The accumulation area 5 extends over at least a portion of the rim of the saw, and the bottom plate 30 of the accumulation area 5 is elevated to achieve this. When using this feller head, the trees are severed and then forced from the butt plate 4, up the ramp 6, and onto the elevated accumulation area 5 by a pivoted harvesting arm. While these butt plates provide a large accumulator, they are difficult to construct as they require multiple bends, machining, bolting and/or welding of the butt plate 4 and ramp 6, as shown in FIG. 3. Furthermore, because the ramp 6 extends radially from the edge of the saw to the motor 11, all accumulated trees must be forced up the ramp 6 to the accumulation area 5. Accumulating trees, therefore, requires a significant degree of force and energy. Additionally, because the accumulation area is flat, once the trees are severed and provided on the accumulation area, they are difficult to keep straight and can slide back and forth on the accumulation plate. Bundles of accumulated trees, therefore, are not stable in the accumulator pocket and can shift during operation.

There remains a need, therefore, for a high accumulation butt plate which is easy and inexpensive to manufacture and which can easily accumulate trees while exerting a limited amount of force and energy.

SUMMARY OF THE INVENTION

In one aspect, the present invention provides a felling head for a feller buncher including a housing, a disc saw blade having a disc and teeth at an outer perimeter of the disc, and a motor, mounted in the housing that drives the disc saw blade with teeth of the blade being exposed in a severance area at the front of the housing. The housing includes a butt plate that is mounted over the disc saw blade that has a severance area portion behind the severance area at the teeth and is generally parallel to the blade. A portion of the accumulation area is angled upward to provide an accumulation area that is sloped upward from the severance area at the butt plate to an outer edge of the butt plate. At least one arm is moveably coupled over the butt plate to move a tree severed by the disc saw into the accumulation area and to maintain the severed tree in the accumulation area. The severed trees held in the accumulation area are each supported from an outer edge of a butt of each tree so that the trees lean inward relative to the felling head.

In one embodiment, the butt plate is upwardly angled along a line extending from a first point adjacent the outer circumference of the butt plate to a second point on an inner edge of the butt plate. In another embodiment, the butt plate is angled along a line parallel to a machine direction of the felling head. In yet another embodiment, the butt plate is angled along a first line extending from a front portion of the butt plate rearwardly in one direction and along a second line extending from the first line in a different direction to the back of the butt plate. A vertically-extending back plate is provided along the sides of the sloping accumulation pocket, wherein the accumulated trees are supported in the sloping accumulation pocket from an outer edge of a butt end of each tree and tend to lean inwardly, preferably toward the vertically extending back plate In another aspect of the invention, a felling head for a feller buncher is provided. The felling head includes a saw housing securable to a logging vehicle, a disc saw blade mounted in the saw housing and having an exposed front portion in a severance area of the housing, and a motor, centered in the saw housing for turning the disc saw blade. A butt plate mounted in the saw housing over the disc saw blade is generally parallel to the blade, and includes a portion that is angled upward from the severance area to an outer edge of the butt plate to form a sloping accumulation pocket for supporting accumulated trees from an outer edge of a butt end of each tree supported on the sloping accumulation pocket. The butt plate can include a debris plate that is coupled beneath the downwardly sloping accumulation pocket in the portion that extends radially beyond the teeth of the saw blade at an entry of the teeth into the saw housing to limit debris from entering the saw housing. The debris plate preferably has a surface that is sloped at the same angle as the accumulation pocket, and can also include a channel over the teeth of the saw blade to provide clearance between the debris deflector and the teeth of the saw blade. A check plate can also be provided between the saw blade and the housing to prevent deflection of the saw blade that would result in teeth of the saw blade impacting the housing.

To limit the entry of debris into the saw housing, the angled portion of the butt plate can be directed along a line along the butt plate selected to direct the flow of chips and debris to exhaust the chips through the saw housing. The saw housing can also include a backplate extending vertically from a back section and opposing side sections of the accumulation pocket to provide a surface against which accumulated trees can rest.

In another aspect of the invention, a butt plate is provided including a toroidal section having an outer circumference sized and dimensioned to extend over a portion of a disc saw blade while maintaining the teeth of the disc saw blade exposed and an inner circumference sized and dimensioned to receive a motor, and an accumulation section, extending laterally from the toroidal section. The accumulation section includes a ramp angling upwardly along a line drawn through the accumulation section from a first point adjacent the teeth of the disc saw blade to a second point on an opposing side of the butt plate to an outer edge of the butt plate.

These and other objects and advantages of the invention will be apparent from the drawings and detailed description.

DETAILED DESCRIPTION OF THE PREFERRED EMBODIMENT

Figure 4:
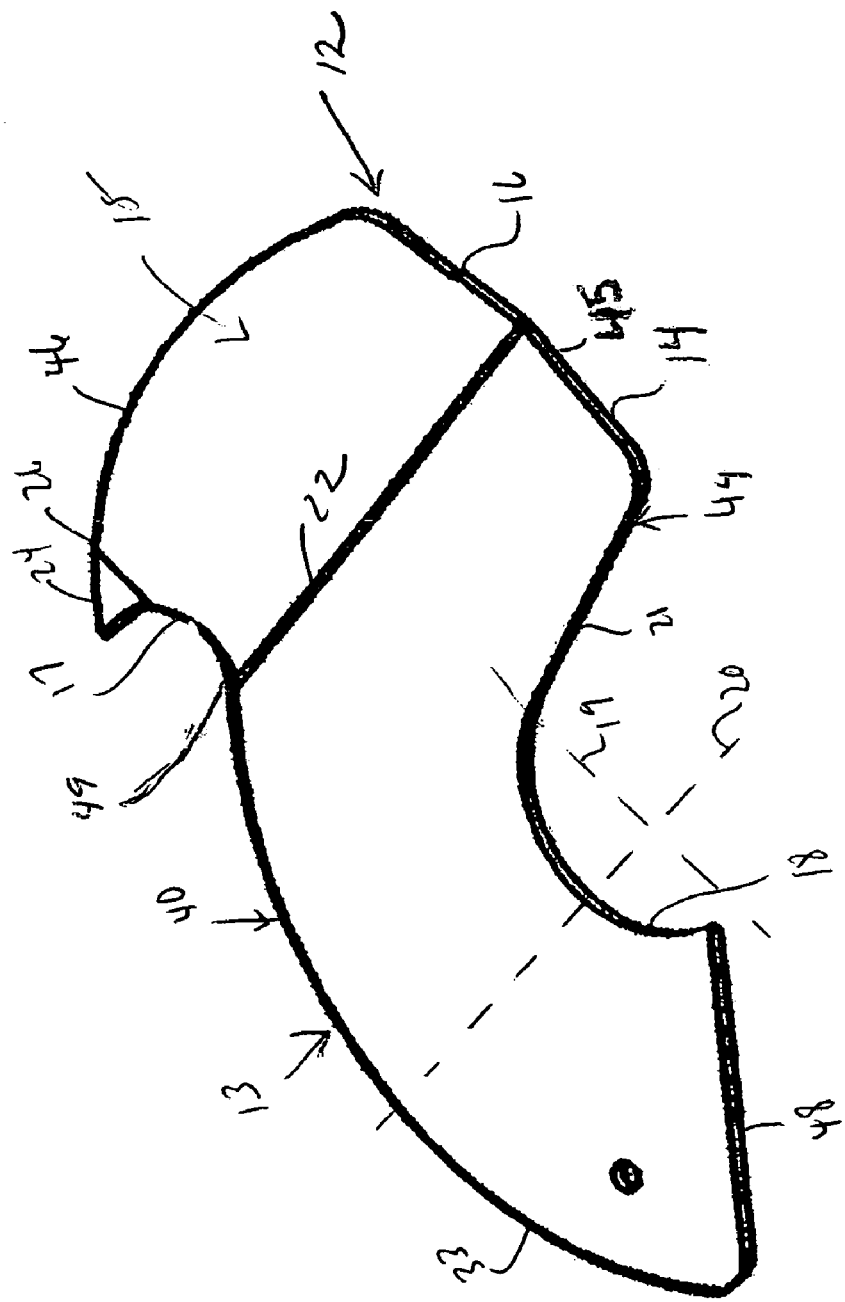
FIG. 4 is a perspective view of a butt plate constructed in accordance with the present invention.

Referring now to the figures and more particularly to FIG. 4, a butt plate 12 constructed in accordance with the present invention is shown. The butt plate 12 comprises a first generally toroidal section 13, or severance area of the butt plate, that is sized and dimensioned to fit inside the teeth 3 of an underlying saw blade 2, and an accumulation pocket 15 extending laterally beyond the teeth of the saw blade 2 and rearwardly behind the exposed teeth 3 of the saw blade 2 to provide an accumulation area for accumulating severed trees. As shown here, the accumulation area 15 comprises both a flat planar portion 14 and a ramped portion 16, where the ramped portion 16 extends from a bend line 22 in the butt plate 12 to the outer edge of the butt plate 12.

Figure 1:
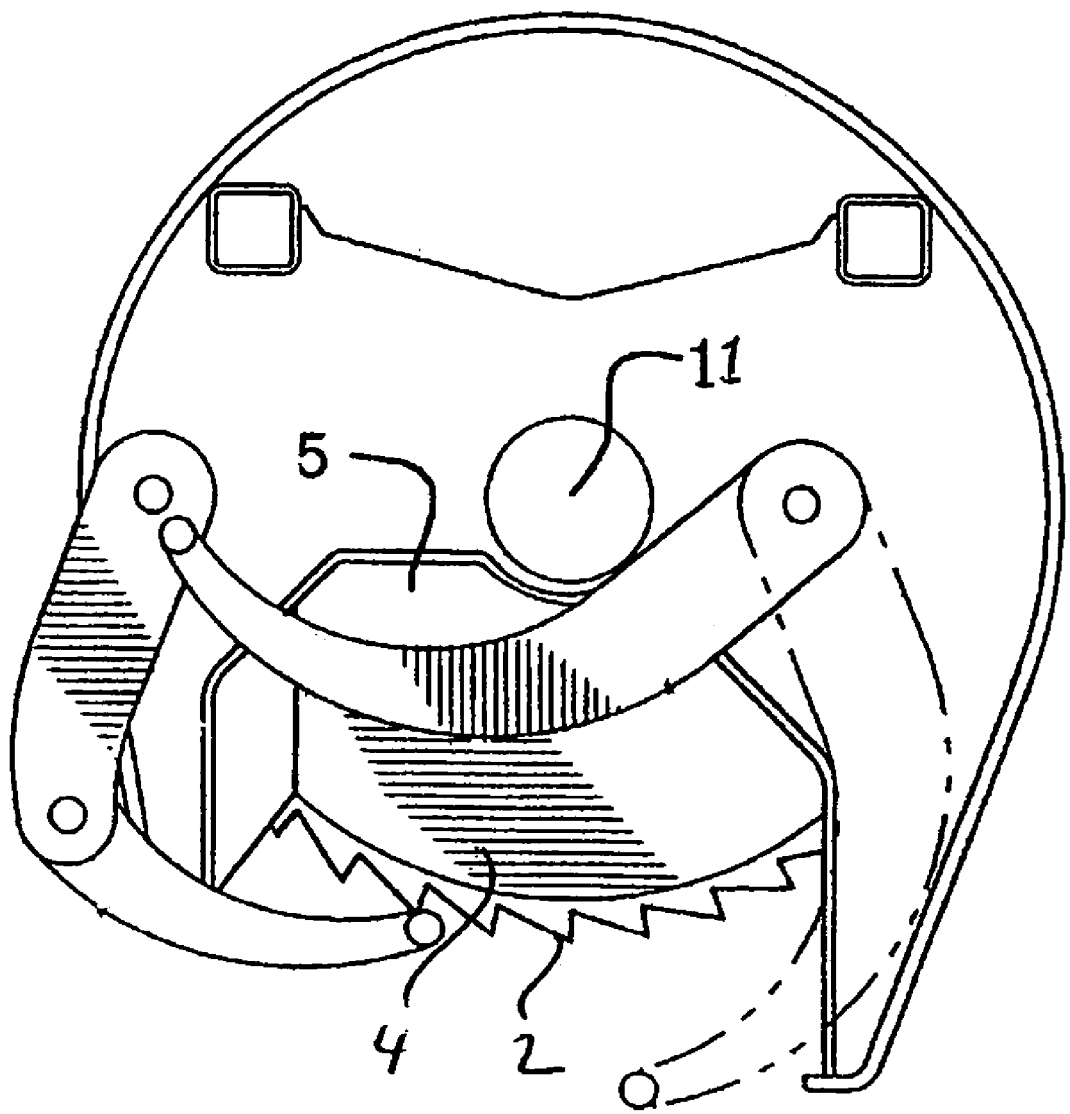
FIG. 1 is a top plan view of a prior art felling head.

Referring still to FIG. 4, the butt plate 12 includes a front edge 40, a back edge 42, and left and right side edges 46 and 48, where left and right are determined as looking into the front of a felling head. The front edge of the butt plate 12 includes a curved section 33, sized and dimensioned to fit inside of the teeth 3 of disc-shaped saw blade 2 (FIGS. 1, 2) as described above, and a laterally-extending section 17. The curved section 33 extends from the right side edge 48 toward a transition point 49, at which the exposed teeth 3 enter a saw housing. From the transition point 49, therefore, it is no longer necessary to expose the teeth 3 for severing trees, and, from this point, the laterally extending section 17 angles forward and toward the left side edge 46, away from the curved section 33, forming a triangular section 24 at the front of the butt plate which, in use, extends over and beyond the teeth 3 of the saw blade 2, to reduce the space above and outside of the teeth 3. The back edge 44 includes an inner radial curve 18, a rearwardly-extending linear section 21, and a laterally-extending linear section 45. The inner radial curve 18 is sized and dimensioned to receive a motor 11 (FIG. 1, 2). The rearwardly extending linear section 21 extends away from the inner radial curve 18 substantially parallel to a center line 20 in the machine direction, and back beyond a lateral center line 19 through the machine, while the laterally-extending section 45, extends substantially perpendicularly to the linear section 21 toward the left side 46. The left side 46 is curved to mate with a saw housing as described below, and extends from the lateral straight section 45 in the back edge 44 to the laterally extending section 17 of the front edge 40. The right side 48 extends from the curved section 33 of the front edge 40 to the curved section 18 of the back edge 42 and can, as shown here, be curved or angled toward the back edge 42.

The curve 33 of the front edge 40 and the curve 18 of the back edge 42 together form the generally toroidal section 13 which is positioned over the saw blade 2. The accumulation pocket 15 is positioned laterally of the toroidal section 13 and includes the area formed between the laterally extending section 17 of the front edge 40, the linearly extending portion 21 of the back edge 42, the left side 46, and the lateral straight section 45 of the back edge. The accumulation pocket 15 therefore provides an area which extends over the teeth 3 of the saw blade 2 for accumulating trees. The accumulation pocket 15 further includes a bend line 22 which is offset from and substantially parallel to the machine direction line 20, and hence to the vertical center line 20 of the felling head 10 and saw blade 2 as drawn along the machine direction.

Figure 2:
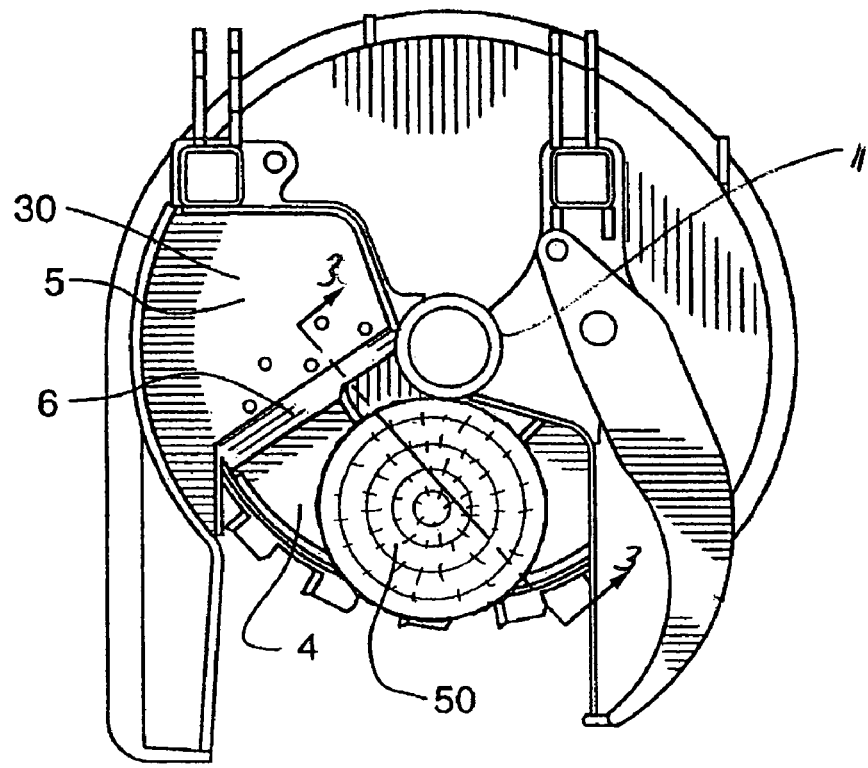
FIG. 2 is a top plan view of a prior art felling head with a high accumulation butt plate.
Figure 3:
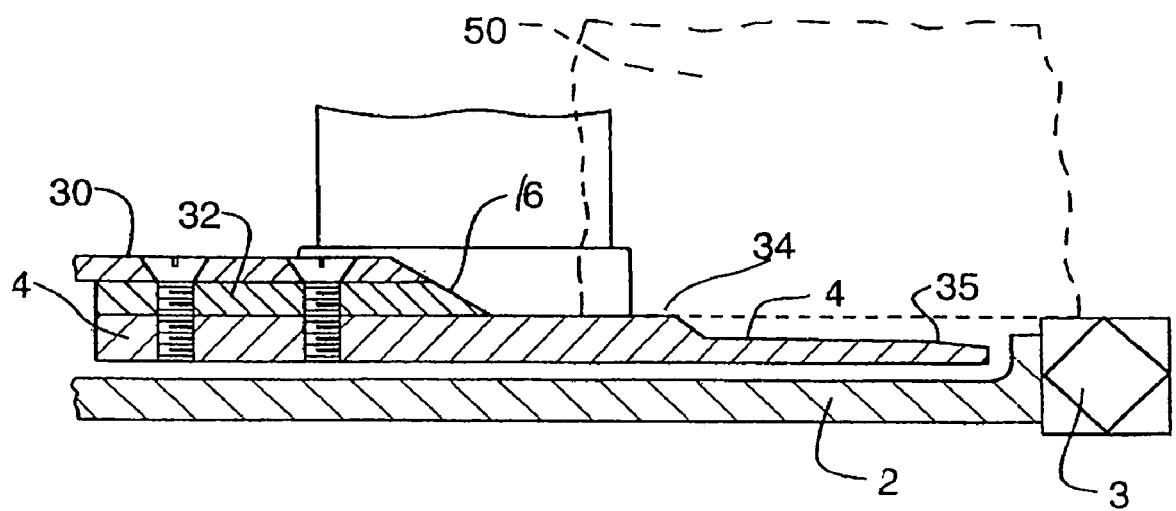
FIG. 3 is a cutaway view of the felling head of FIG. 2 taken along line 3—3.
Figure 5:
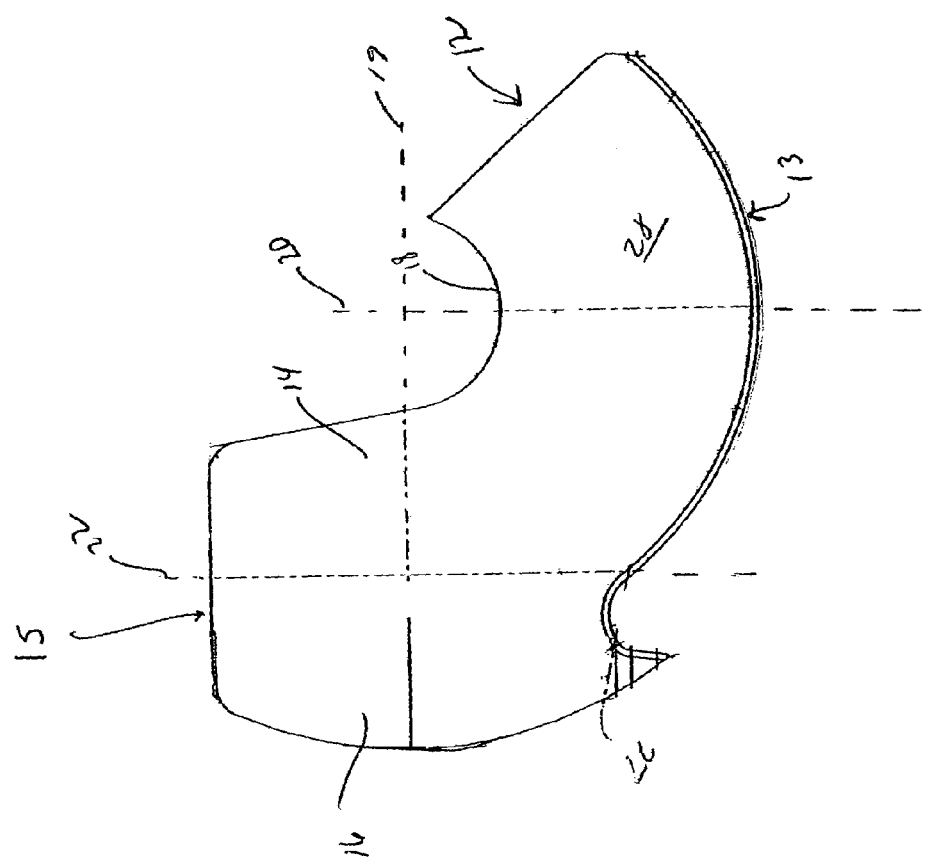
FIG. 5 is a top plan view of the butt plate of FIG. 4, prior to bending.

Referring now to FIG. 5, the butt plate 12 of FIG. 4 is constructed from substantially flat metal plate 28. The angled portion 16 is constructed by bending the accumulation pocket 15 front to back along the bend line 22 or by welding two substantially flat plates at an angle (e.g., 20°). As described above, the bend line 22 is substantially parallel to the machine direction line 20 of the saw blade 2, typically the direction that trees are fed into the felling head 10 as shown in FIG. 2. A second bend, along bend line 26, returns the edge 24 of the small triangular area that borders line 26 to a horizontal plane substantially parallel to the planar portion 14. This corner is bent down to ease the accumulating of larger diameter trees, so the head can handle a broader range of tree sizes.

Figure 6:
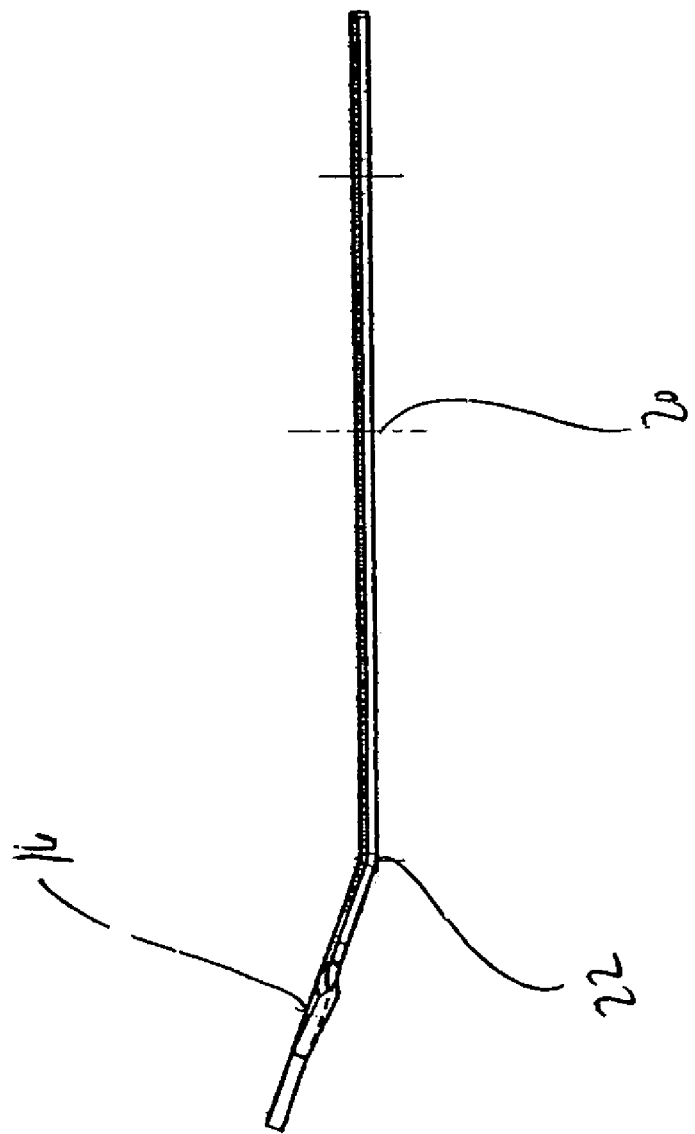
FIG. 6 is a side view of the butt plate of FIG. 4, viewed in the direction of the bend line.

Referring now to FIG. 6, a side view of the butt plate 12 of FIG. 4 is shown. As can be seen here the butt plate 12 is horizontally planar through the toroidal section 13 and the flat planar portion bordered by line 26 and edge 24 of the accumulation pocket 15. The ramp portion 16 begins at the bend line 22, and as shown here, extends up at an angle of approximately 20 degrees to the horizontal planar surface of the butt plate 12, and continues at an upward slope to the outer edge of the butt plate 12.

Figure 7:
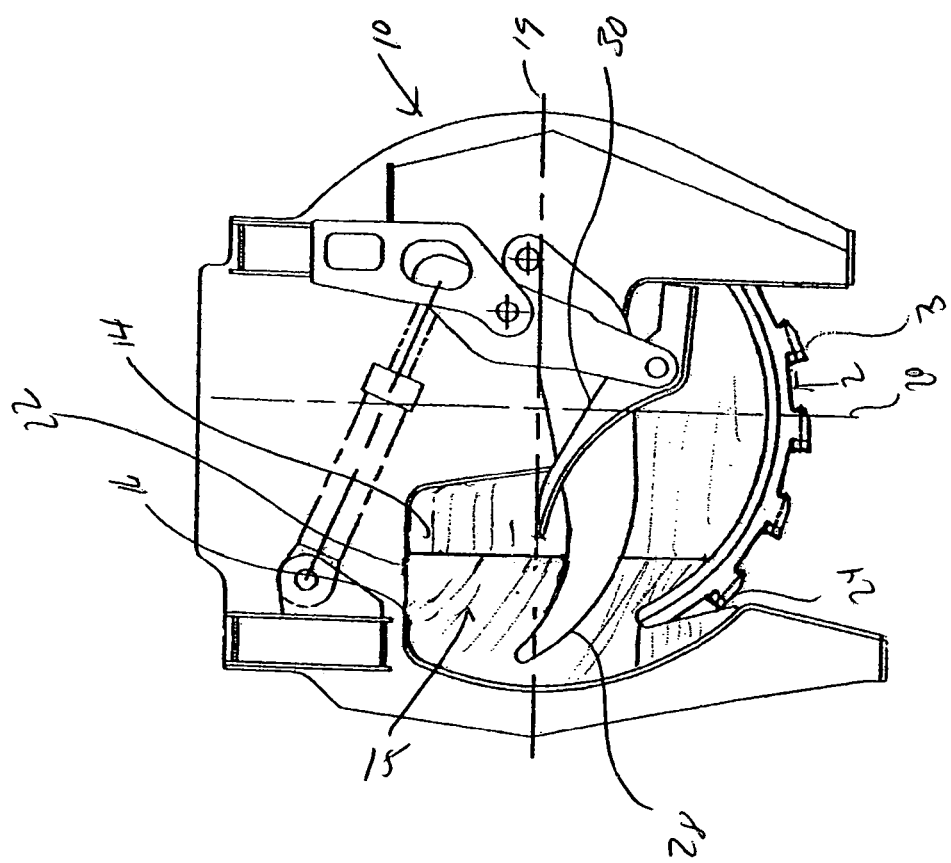
FIG. 7 is a top plan view of a felling head of the present invention incorporating the butt plate of FIG. 4.

Referring now to FIG. 7, a felling head 10 constructed to include the butt plate 12 of FIG. 1 is shown. As can be seen in FIG. 7, the butt plate 12 is provided in a saw housing 29 and positioned such that the toroidal portion 13 is provided over the saw 2 allowing the teeth 3 to extend radially therefrom and therefore be exposed at the severance area of the housing 29. The accumulation pocket 15 extends rearward beyond a lateral center line 19 of the saw (perpendicular to the machine direction), and includes the ramped portion 16 which, as described above, extends in a direction laterally offset from but substantially parallel to a longitudinal center line 20 of the saw 2 in the machine direction. A harvesting arm 28 and an accumulation arm 30 are pivotally mounted over the butt plate 12 for moving severed trees from the severance area in which the blade is exposed for cutting that extends to each side of longitudinal center line 20 and to the accumulation pocket 15, and for retaining accumulated trees therein.

Trees are fed into the felling head 10 in the machine direction as defined by the line 20. As a tree is cut it is accumulated initially in the flat portion 14 of the accumulation area 15, therefore requiring very little applied force from harvesting arm 28 to accumulate the tree into the accumulation pocket 15. As additional trees are accumulated, harvesting and accumulator arms 28 and 30 are activated to force the tree up the ramp portion 16 providing additional storage for the trees. The ramped portion 16 encourages accumulated trees to lean and slide inward, generally toward the center of the saw blade 2, thereby keeping the trees both straight and neatly bunched during accumulation. Only when there is insufficient room on the lower level 14 of the butt plate for additional trees are trees forced up the ramp 16.

Figure 8:
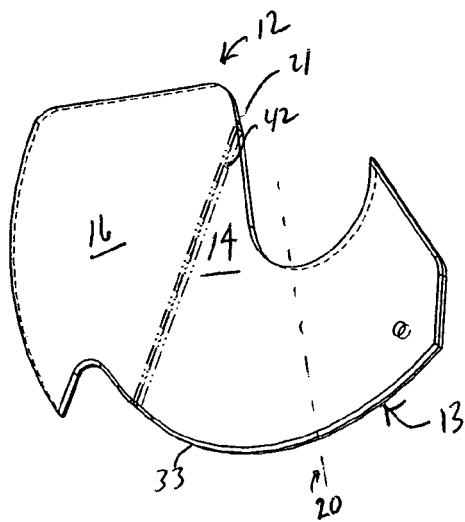
FIG. 8 is a perspective view of a second embodiment of a butt plate constructed in accordance with the present invention.

Referring now to FIG. 8, a butt plate 12 constructed in accordance with a second embodiment of the invention is shown. Here, again, the butt plate 12 comprises a first generally toroidal section 13 and an accumulation pocket 15 which includes a ramped portion 16, and is constructed generally as described above with reference to FIG. 4. Here, however, rather than extending parallel to the longitudinal center line 20 drawn in the machine direction (i.e. the direction of straight line forward travel of the machine to which the head is attached), the bend line 42 is angled across the butt plate 12, extending from a first point on the curved portion 33 of the front edge 40 of the butt plate 12 and offset from the center line 20 to a second point on the linear portion 21 of the back edge 44 of the butt plate 12, which is offset from but relatively closer to the center line 20, such that the bend line 42 angles toward the center line 20 as it moves from the front of the butt plate 12 toward the back of the butt plate 12, so as not to choke off the open area around the blade downstream of the severance area. As described above, the outer circumference of the toroidal area 13 is sized and dimensioned to extend over a saw blade 2, while allowing the teeth 3 to extend radially beyond the butt plate 12 in the severance area. The accumulation area 15, however, extends radially, laterally and rearwardly beyond the toroidal section to provide a larger area for accumulating trees.

Figure 9:
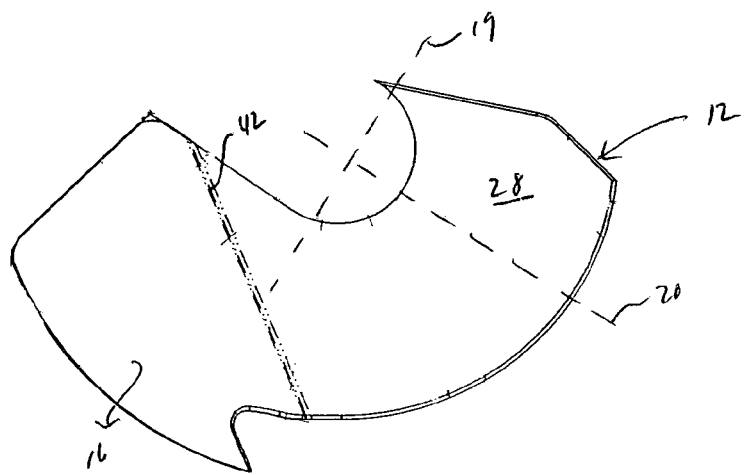
FIG. 9 is a top plan view of the butt plate of FIG. 8, prior to bending.
Figure 10:
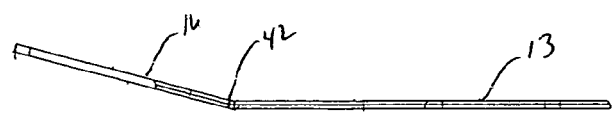
FIG. 10 is a side view of the butt plate of FIG. 8, viewed in the direction f the bend line.

Referring now to FIG. 9, as described above with reference to FIG. 5, the butt plate 12 is constructed from a substantially flat metal plate 28. The angled portion 16 of the accumulation pocket 15 is constructed by bending the flat metal plate 28 upward along the bend line 42 or welding two plates at an angle. Also as described above, the bend line 42 is angled with respect to the vertical center line 20 of the saw blade 2. Referring now to FIG. 10, a side view of the butt plate 12 of FIG. 8 is shown. As can be seen here, the butt plate 12 is horizontally planar through the toroidal section 13. The ramp portion 16 begins at the bend line 42 and extends up at an angle of approximately fifteen degrees to the horizontal planar surface of the butt plate 12, and continues sloping upward to the outer edge of the butt plate 12.

Figure 11:
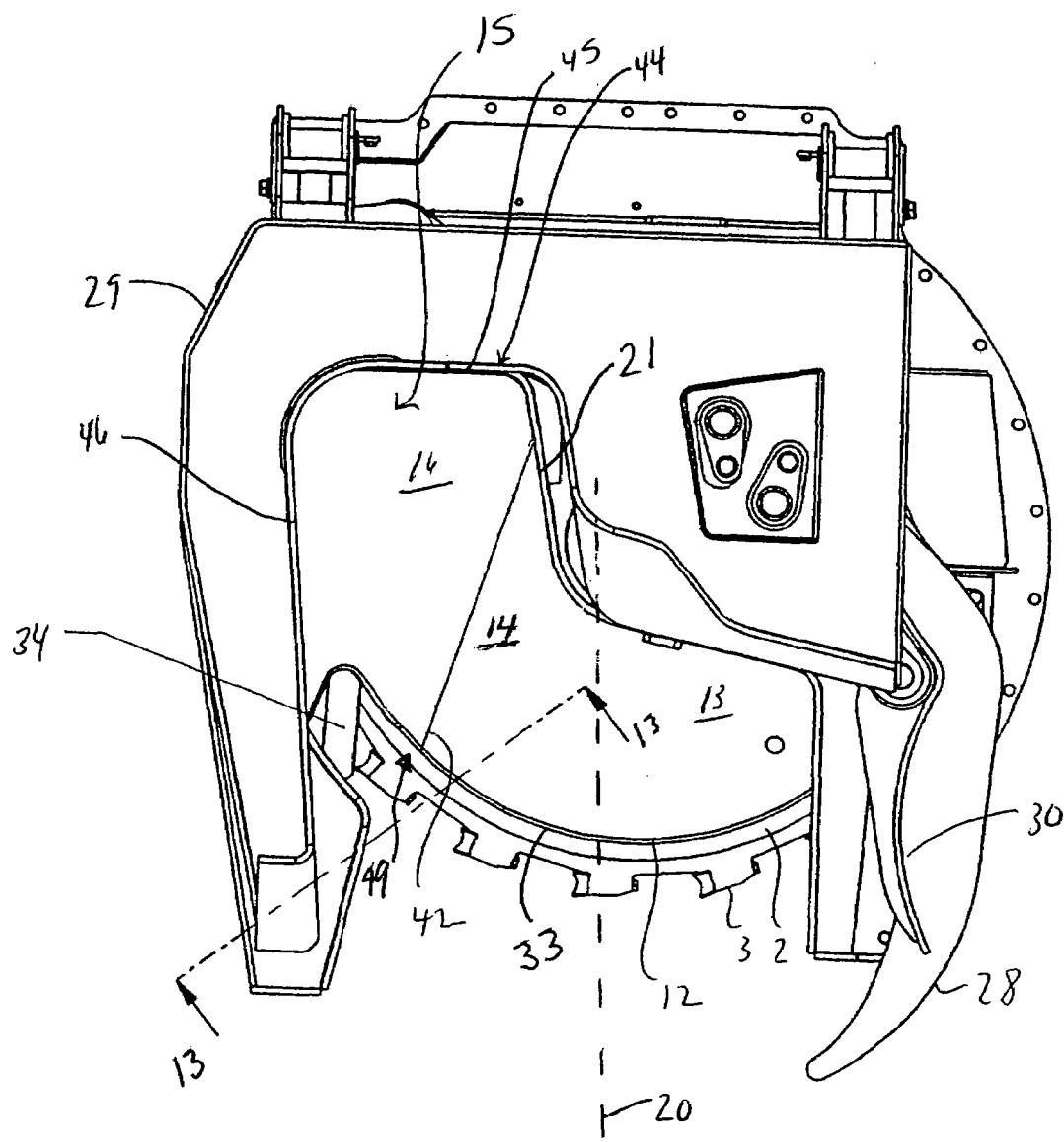
FIG. 11 is a top plan view of a felling head of the present invention incorporating the butt plate of FIG. 8.
Figure 12:
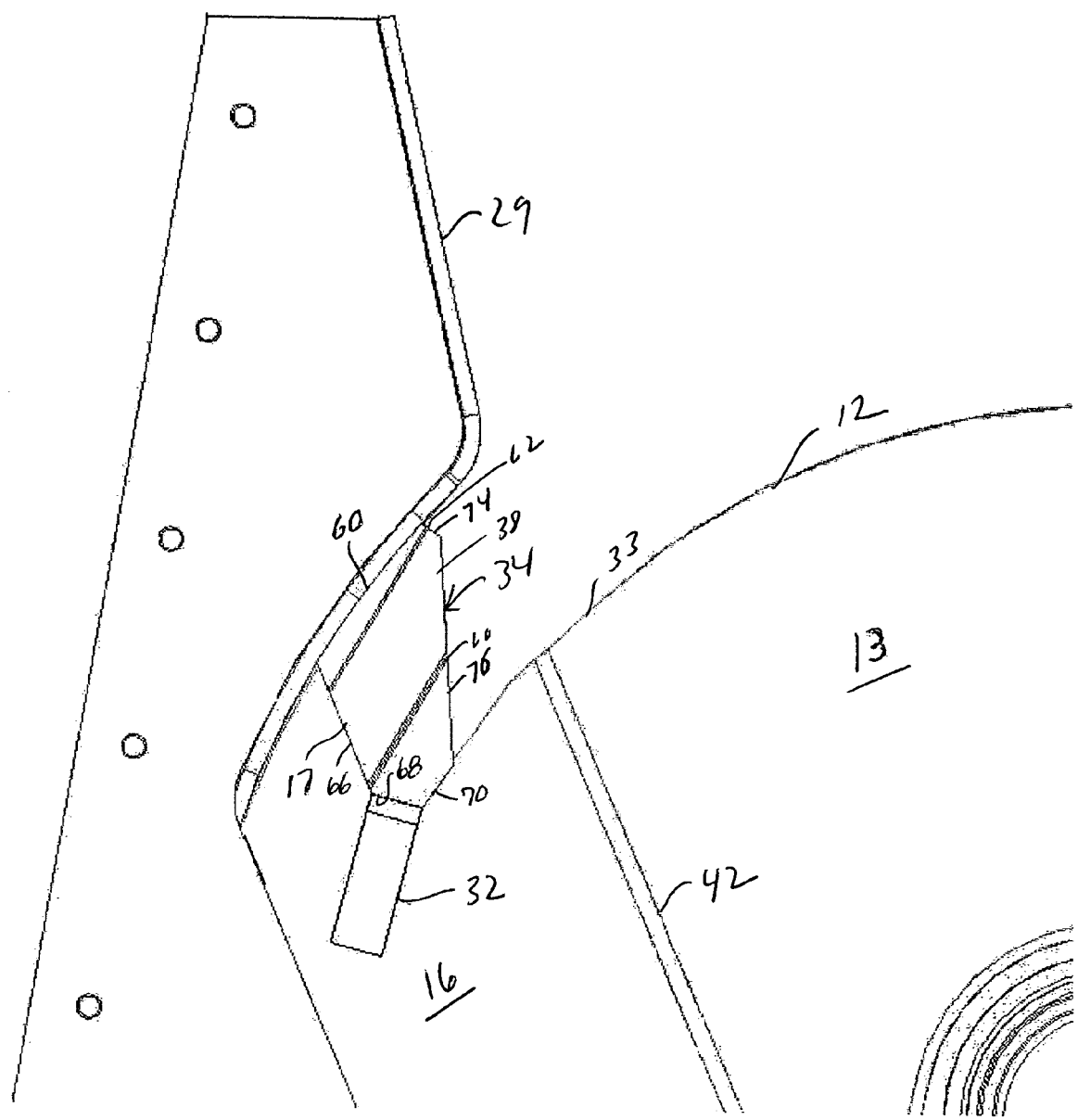
FIG. 12 is a bottom view of the felling head of FIG. 11 showing a check plate and debris plate coupled to the underside of the ramped portion of the accumulation area.

Referring now to FIG. 11, a felling head 10 constructed to include the butt plate 12 of FIG. 8 is shown. The felling head 10 includes a saw housing 29 in which the saw blade 2 and butt plate 12 are mounted. The butt plate 12 is again mounted above the saw blade 2 such that the toroidal portion 13 is provided over the saw 2 allowing the teeth 3 of the saw 2 to extend radially beyond the butt plate 12 in the severance area. The accumulation pocket 15 extends laterally beyond the teeth 3 of the saw blade 2, and includes the ramped portion 16 which, as described above, angles from a first point on the curved outer edge 33 of the butt plate 12 to a second point on the linear portion 21 of the back edge 44 of the butt plate 12, and therefore generally toward the center line 20 of the felling head 10. The bend line 42 provides an accumulation pocket 15 including both an angled portion 16 which extends from the bend line 42 to an outer edge of the butt plate, and a small flat portion 14. A harvesting arm 28 and an accumulation arm 30 are pivotally mounted over the butt plate 12 for moving severed trees from the severance area of the butt plate 12 which extends on each side of line 20, to the ramped portion 16 of accumulation pocket 15, and for retaining accumulated trees thereon. Referring now to FIG. 12, the severed trees are retained on the ramped portion 16 of the accumulator pocket 15, and are held in position by the accumulator arm 30. Because the plate 16 is angled downwardly toward the center line 20, the severed trees are aligned and stable in the pocket. Referring again to FIG. 11, a debris plate 34 is coupled beneath the angled portion 16 of the butt plate 12 to prevent wood chips and debris from entering the saw housing 29, as described below.

Figure 13:
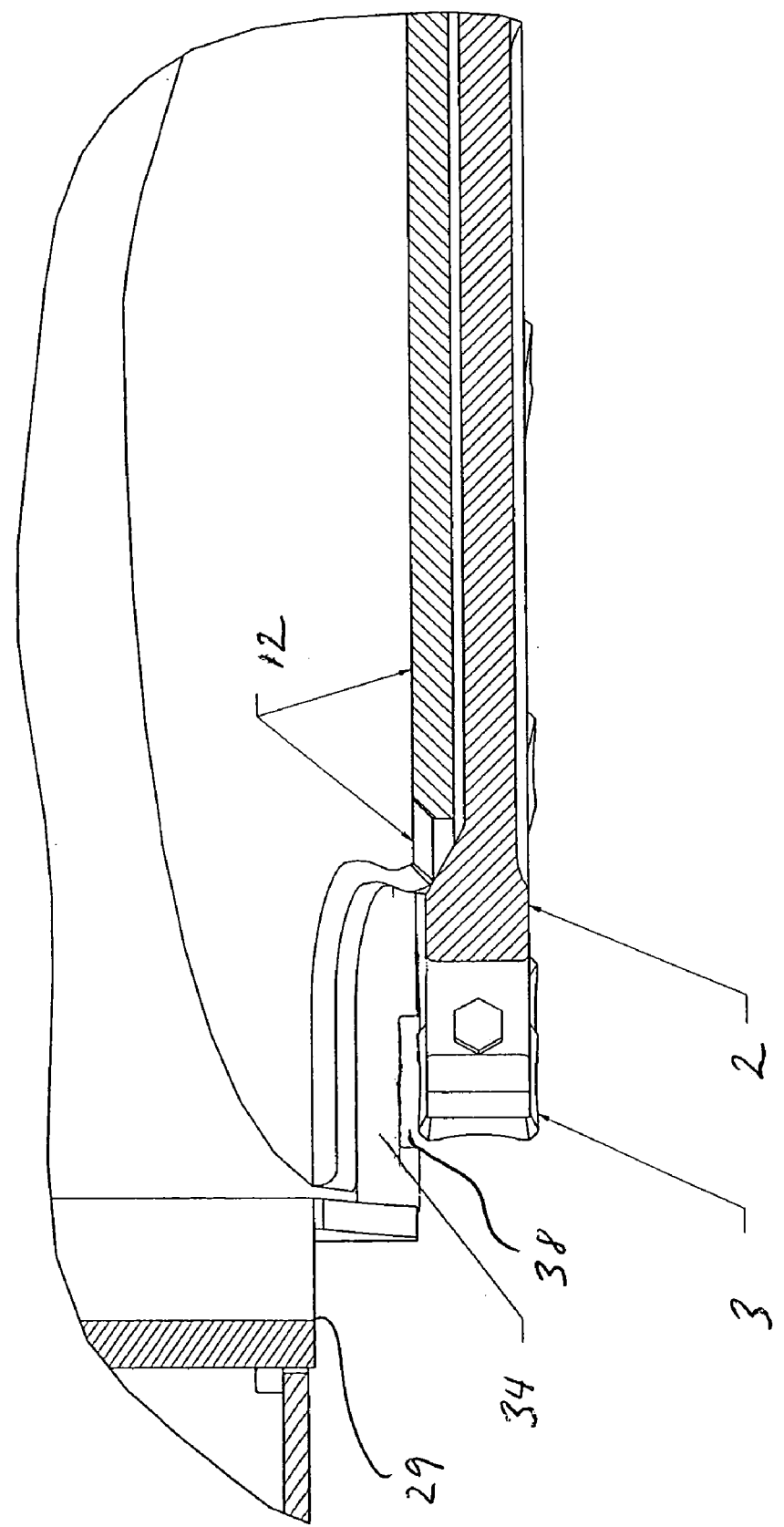
FIG. 13 is a fragmentary cross-sectional view taken along the line 13—13 of FIG. 11.
Figure 14:
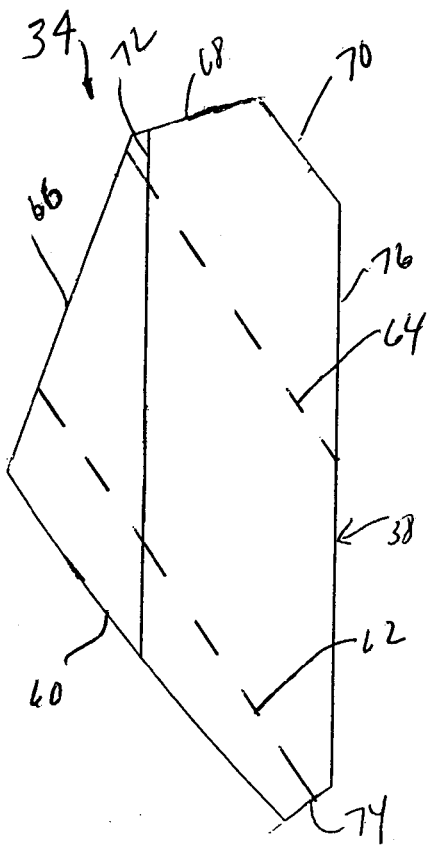
FIG. 14 is a top view of the debris deflector plate of FIG. 11.
Figure 15:
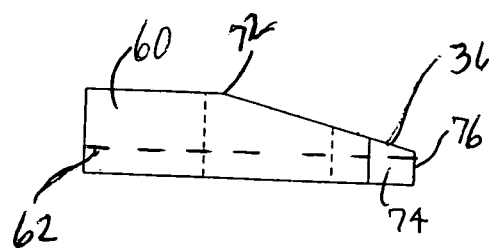
FIG. 15 is a side view of the debris deflector plate of FIG. 14.

Referring now to FIG. 12, a partial bottom view of the felling head 10 of FIG. 11 is shown illustrating the debris plate 34 and a check plate 32. The debris plate 34 is welded or otherwise coupled beneath the butt plate 12 adjacent to the transition point 49 between the curved section 33 and the laterally-extending section 17 of the front edge 40 of the butt plate 12 where the exposed teeth 3 of the saw blade 2 enter the saw housing 29, and therefore where wood chips and debris are most likely to enter the saw housing 29. Referring now also to FIG. 13, the debris deflector plate 34 is a six-sided plate. A first side 60 is curved at the radius of curvature of the saw housing 29 to allow the debris plate 34 to abut the saw housing 29. The sides 66, 68, and 70 are sized, dimensioned and angled to follow the corner formed between transition point 49 between the curved portion 33 of the front edge 40 of the butt plate 12 and the laterally extending portion 17. The side 76 extends linearly from the side 70 to the side 74, which extends forward and angles toward the curved side 60. A channel 38 is formed in the bottom of the debris plate 34 between a first line 62 and a second line 64. When in position coupled to the butt plate 12, the side 70 extends from a point on the curved portion 33 of the front edge of the butt plate 33 offset toward the center line 20 from the transition point 49 to an endpoint position near the saw housing 29, and the side 74 angles from the endpoint of the side 76 toward the saw housing 29, thereby substantially closing off the area beneath the butt plate 12 and between the saw blade 3 and the saw housing 29 from the exposed front area of the saw blade 2. Referring now also to FIG. 14, the debris deflector plate 34 is sloped down from the line 72 toward the side 76 at an angle selected to be substantially the same as the angle of the bend at the bend line 42 which, here, is fifteen degrees.

Referring now also to FIG. 13, a cutaway view of the felling head 10 taken along the line 13—13 of FIG. 11 is shown. As described above, the debris plate 34 is coupled, and preferably welded, beneath the butt plate 12 and, when provided in the felling head 10, is positioned between the plate 12 and the saw blade 2. The bottom of the debris deflector plate 34 is, as described above, machined to provide a channel 38 which prevents the debris deflector plate 34 from contacting and damaging the teeth 3 of the saw blade 2. As described above, the debris deflection plate 34 is wedge-shaped, and angles down to close the gap between the butt plate 12 and saw blade 3 to inhibit plugging of the housing by wood chips or other debris.

Referring again to FIG. 12, the check plate 32 extends behind the debris deflection plate 34, substantially following the angle of the curve 33 of the front edge 40 of the butt plate 12, and is welded or otherwise coupled to the underside of the butt plate 12 at the transition point 49 where the saw blade 2 moves under the butt plate 12. The check plate 32 prevents the saw blade 12 from deflecting into the butt plate 12, and therefore limits the possibility of damaging the teeth 3 of the saw blade 2.

Figure 16:
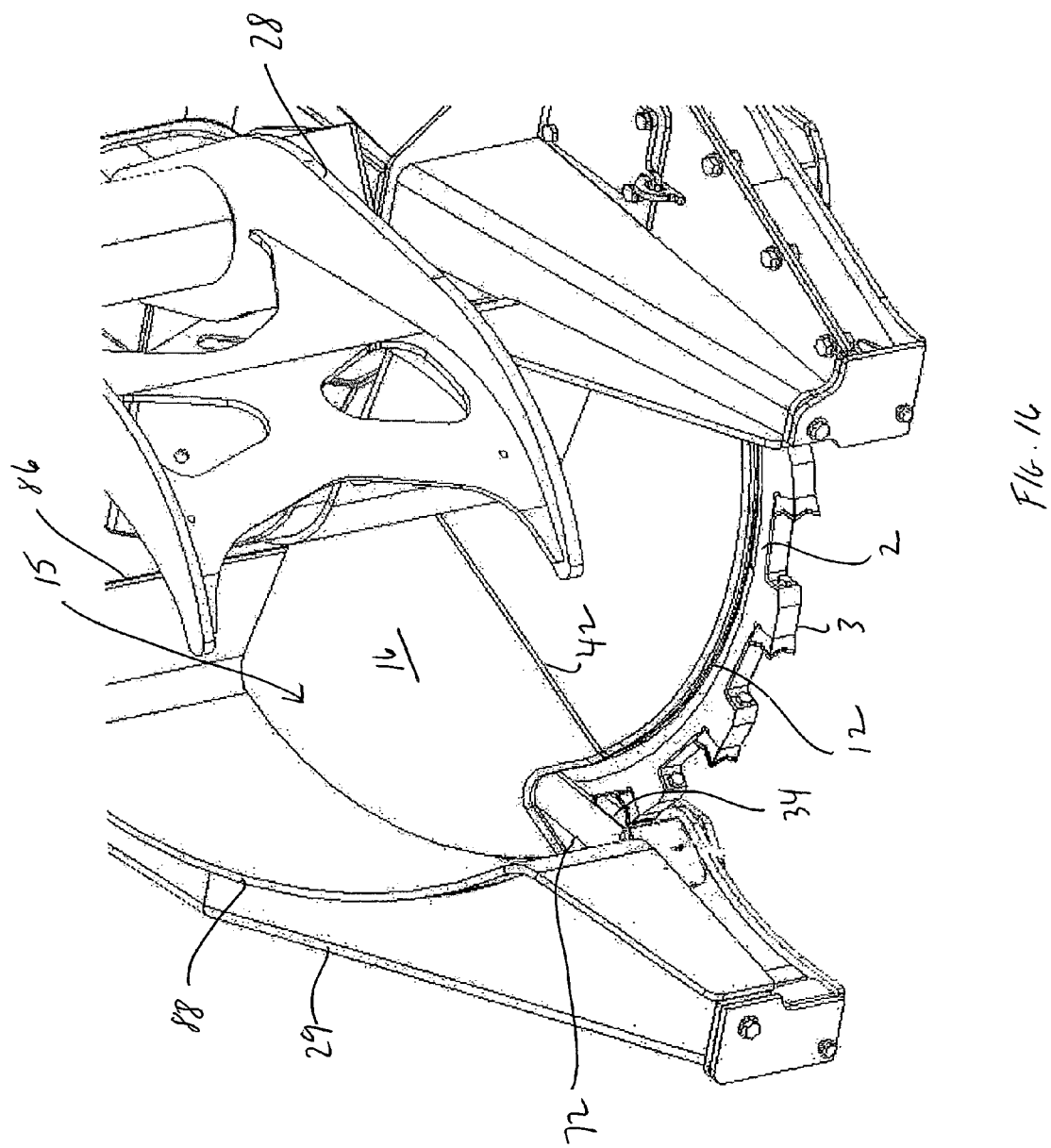
FIG. 16 is a perspective view of the felling head of FIG. 11.
Figure 17:
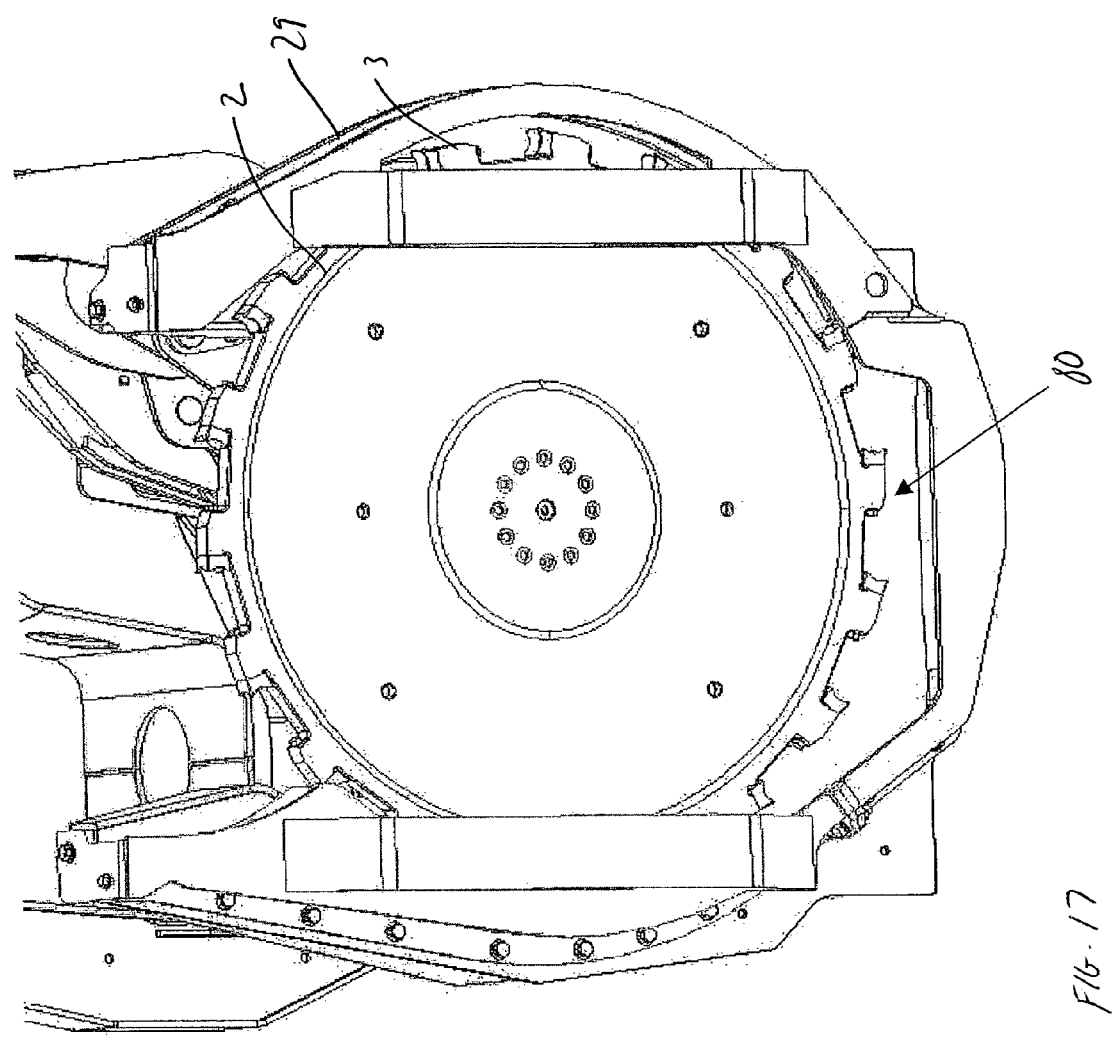
FIG. 17 is a bottom view of the felling head of FIG. 11 illustrating a rear exhaust.
Figure 18:
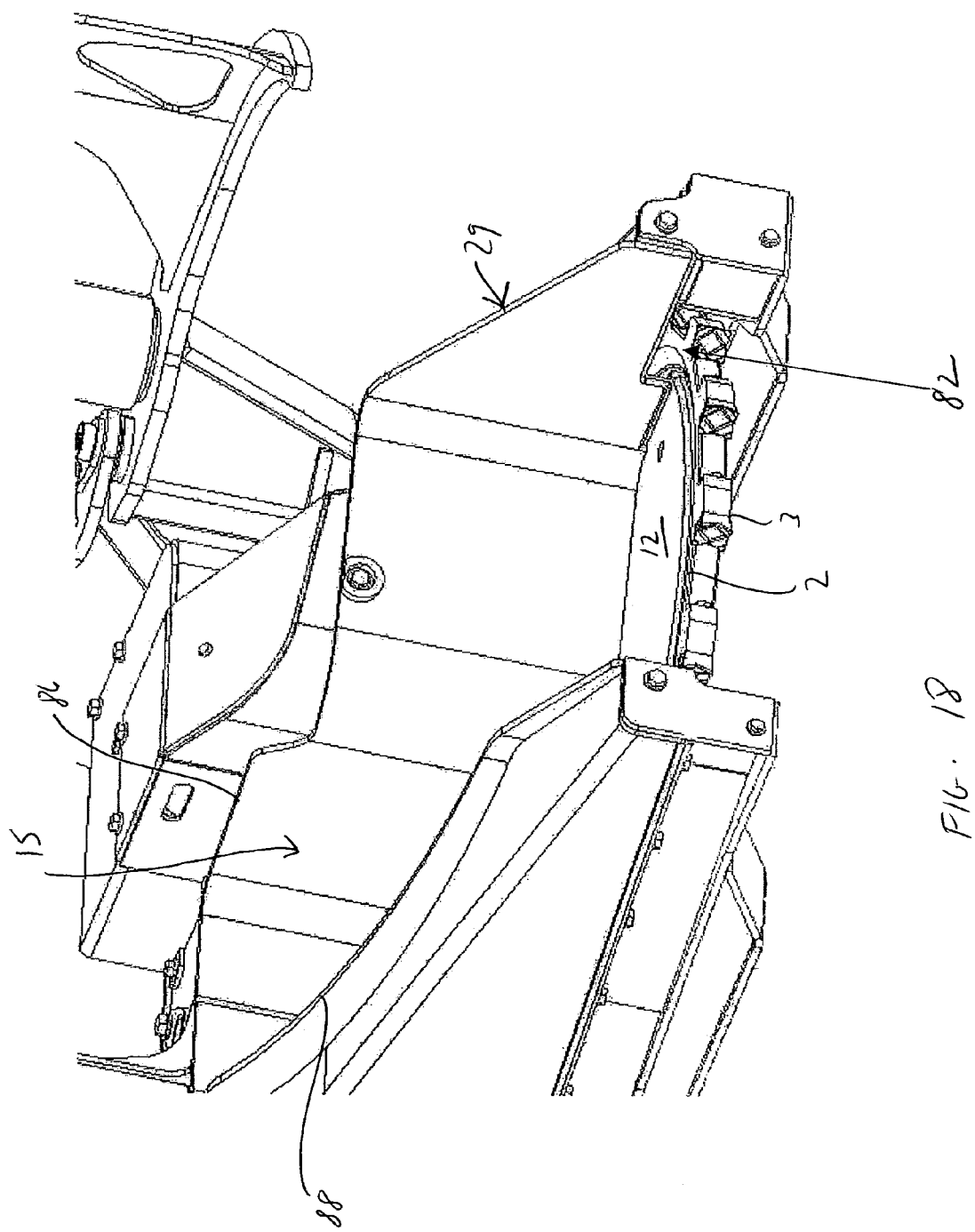
FIG. 18 is a front perspective view of the felling head of FIG. 11 illustrating an additional wood chip exhaust point.

Referring now to FIGS. 16–18, the felling head 10 further manages the flow of wood chips and debris through the saw housing as described more fully in U.S. Pat. Nos. 6,068,035 and 6,176,280, which are hereby incorporated by reference for their description of such systems. Here, as trees are accumulated, wood chips and debris are exhausted from the saw housing in a number of locations. First, referring to FIG. 16, the debris plate 34 provided beneath the butt plate 12 limits or prevents wood chips and debris from entering the saw housing 29. Referring now to FIG. 17, the angle of the bend line 42 across the butt plate 12, furthermore, is selected to direct the flow of wood chips and debris around the saw housing 29, toward a secondary exhaust point 80 provided at the back of the saw housing 29. Wood chips and other debris which is not exhausted through the back of the housing 29 follow the flow of the saw blade 2 to an exit aperture 82 provided on the right hand side of the saw housing 29. By providing a path for wood chips and debris which promotes a flow of chips toward exhaust areas in the saw housing 29, the potential for plugging the saw housing 29 with wood chips or other debris is limited.

Figure 19:
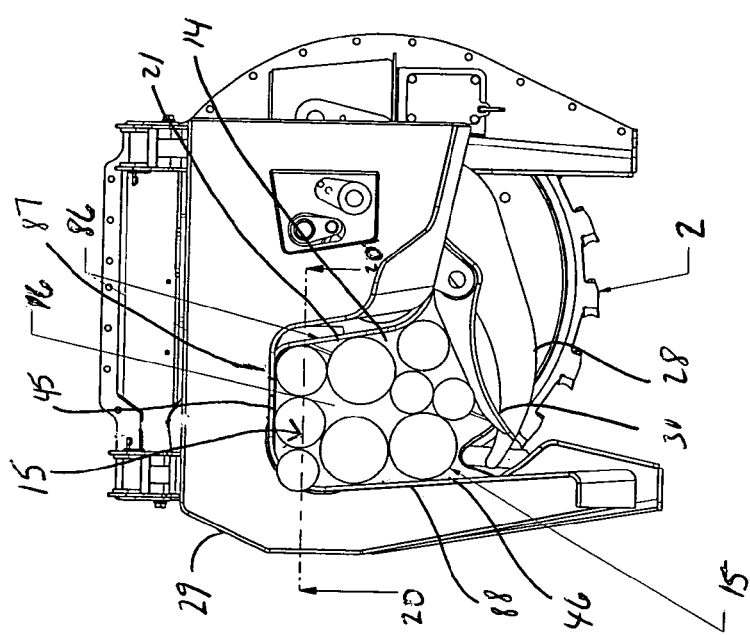
FIG. 19 is a top view of the felling head of FIG. 11 with the accumulation pockets full.
Figure 20:
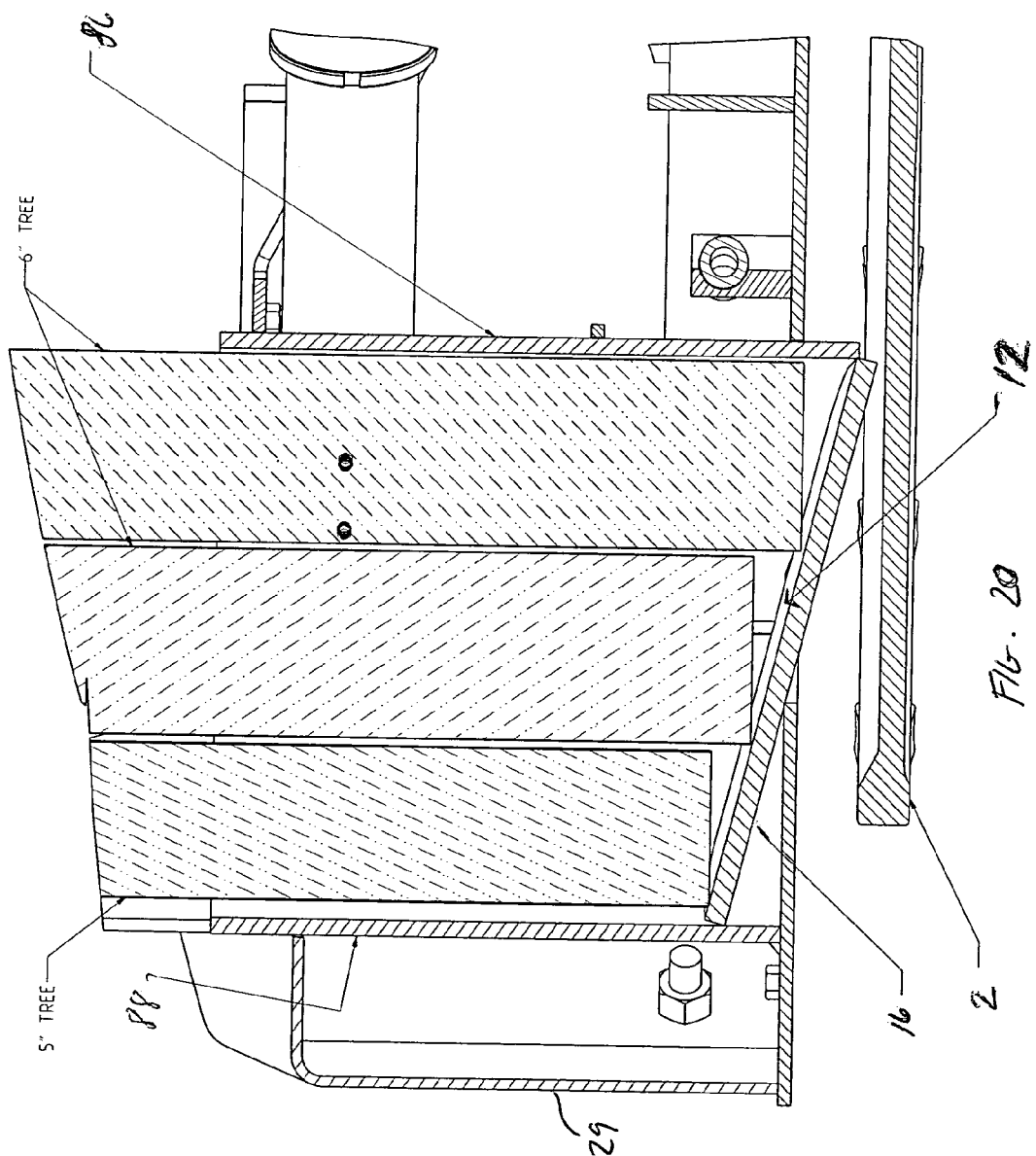
FIG. 20 is a cutaway view of the felling head of FIG. 19 taken along the line 20—20 of FIG. 19.

Referring again to FIG. 16 and also to FIGS. 19 and 20, it can be seen that the saw housing 29 includes substantially vertical backing plates 86, 87, and 88 which surround the accumulation area 15, extending upwardly from the linearly extending portion 21 of the back edge 44 of the butt plate, the laterally extending portion 45 of the back edge 44 of the butt plate 12, and the left edge 46 of the butt plate 12, respectively. The backing plates 86, 87, and 88 therefore provide a walled structure surrounding the accumulation pocket 15. Referring now specifically to FIG. 19, as trees are harvested by the harvesting arm 28, they are accumulated into the accumulation pocket 15, and the accumulation arm 30 maintains the trees in the accumulation pocket 15. Referring now also to FIG. 20, as trees are accumulated in the pocket 15, they are maintained in a substantially balanced, upright position against the ramped portion 16 of the pocket 15. Trees supported on ramped portion 16 are supported by an outer edge of the butt of the tree, and the inner edge is unsupported, so that the trees lean inward, generally toward the backing plate 86 adjacent the longitudinal center plane of the disc saw. The trees, therefore, are more stable in the accumulation pocket as compared to the prior art, and are maintained in a straighter bundle which is easier to handle. Although the backing plates 86, 87, and 88 are shown and described specifically with reference to the embodiment of FIG. 11, it will be apparent that the saw housing 29 and the stacking would be similar for the first embodiment of the invention shown in FIG. 4, and the third embodiment described below.

Figure 21:
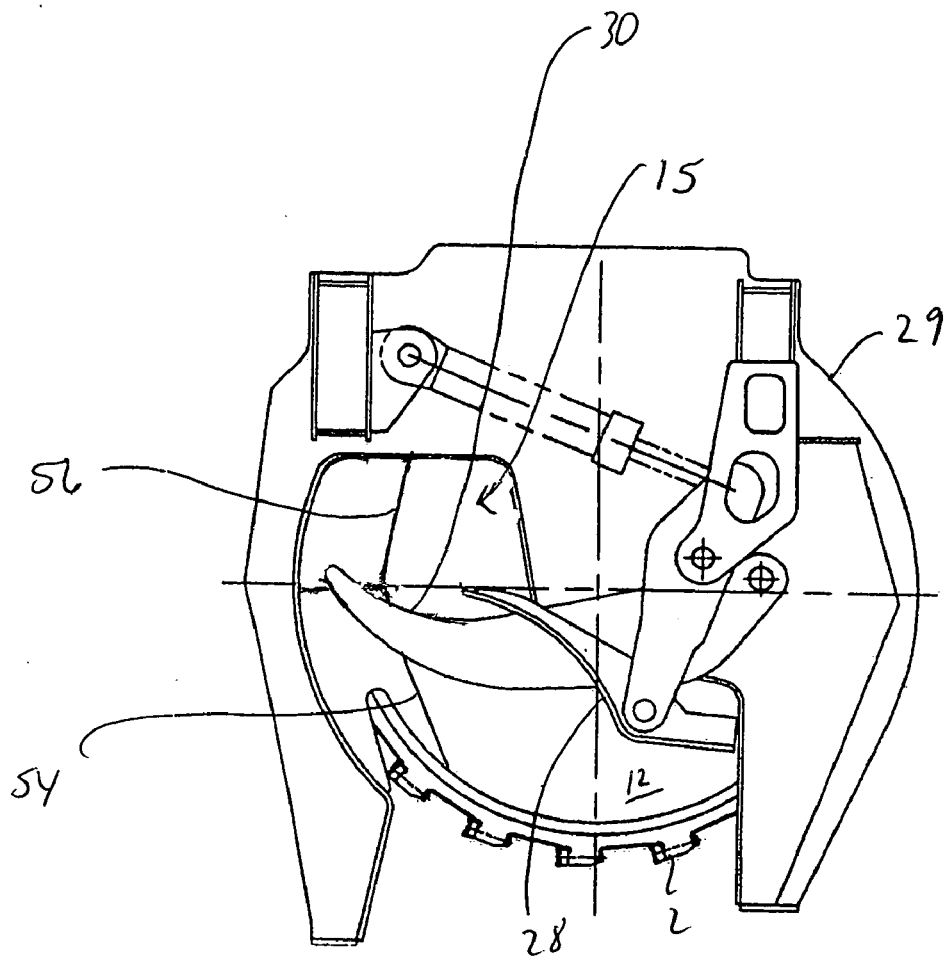
FIG. 21 is a top view of a felling head with a butt plate constructed in accordance with a third embodiment of the invention.

Referring now to FIG. 21, a third embodiment of a feller head 10 including a butt plate 52 is shown. The butt plate 52 is again constructed from a flat piece of material 28 generally as described above. Here, however, the ramped portion 16 of the accumulation pocket 15 is formed with two bends 54 and 56. The bends 54 and 56 are formed in the accumulation pocket 15 along the circumference of the butt plate 12. The first bend 54 is formed extending from the exposed front at the butt plate to about the horizontal center line 19, and generally follows the curve of the outer circumference of the butt plate 12. The second bend 56 extends from the end point of the first bend, at the approximate horizontal center point 19 toward the back of the butt plate 12, again substantially following the curve of the circumference of the butt plate 12. The double bend including bends 54 and 56 therefore substantially follow the outer circumference of the butt plate from front to back.

Figure 22:
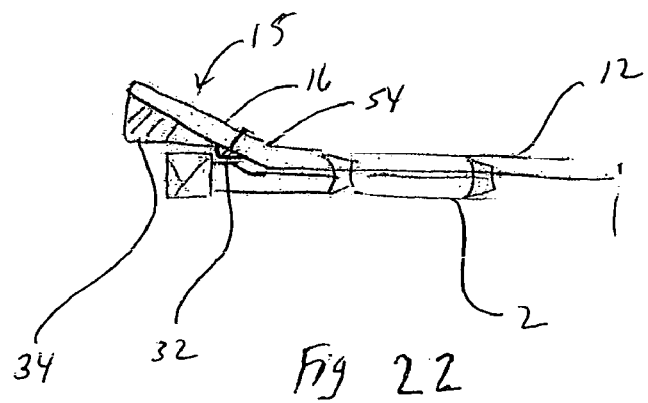
FIG. 22 is a side view of the felling head of FIG. 19, illustrating a debris and check plate.

Referring now to FIG. 22, a view looking forward into the front of the felling head 10 is shown. Here, a check plate 32 and debris plate 34 are preferably coupled under the ramped section 16. The check plate 32, as described above, limits motion of the saw blade 2 to prevent deflection into the butt plate 12. The debris plate 34 inhibits debris from entering the saw housing 29. As described above, the debris plate 34 can also be sloped downward, toward the front of the felling head 10 and/or sharpened to provide a blade for cutting through debris (wood chips). Furthermore, as described above with reference to the bend line 42, the double bend provided by bend lines 54 and 56 provides a ramp 16 which directs debris and wood chips in the saw housing 29 around the saw housing 29 to an exit side to prevent plugging. As described above, the form of the ramp 16 here is selected to direct debris and wood chips around and out of the saw housing 29.

Although a number of specific embodiments have been shown, it will be apparent that variations can be made within the scope of the invention. For example, although specific ramping bend patterns have been shown, it will be apparent that various angles directed generally toward the center of the felling head can also be used. Furthermore, although the method of forming the ramped section is described as bending the butt plate along a bend line, various other methods of forming a ramp, such as welding pieces together at an angle, could also be used.

A preferred embodiment of the invention has been shown and described in detail. Many modifications and variations of the embodiment described will be apparent to those skilled in the art. For example, various mechanisms may be used to power the inner and outer arms opened and closed. Therefore, the invention is not limited to the embodiment described.

I claim:

1. A felling head for a feller buncher, comprising:
a housing;
a disc saw blade having a disc and teeth at an outer perimeter of the disc;
a motor, mounted in the housing that drives the disc saw blade with teeth of the blade being exposed in a severance area at the front of the housing, the housing including a butt plate that is mounted over the disc saw blade that has a severance area portion behind the severance area at the teeth and is generally parallel to the blade and an accumulation portion including an accumulation area that is angled upward relative to the severance area, the accumulation area sloping over the teeth of the blade to an outer edge of the butt plate; and
at least one arm moveably coupled over the butt plate to move a tree severed by the disc saw onto the accumulation area and to maintain the severed tree on the accumulation area, wherein the severed trees held on the accumulation area are each supported from an outer edge of a butt end of each tree.

2. The felling head as defined in claim 1, wherein the butt plate is upwardly angled along a line extending from a first point adjacent the outer circumference of the butt plate to a second point on an inner edge of the butt plate.

3. The felling head as defined in claim 1, wherein the butt plate is angled along a line parallel to a machine direction of the felling head.

4. The felling head as defined in claim 1, wherein the butt plate is angled along a first line extending from a front portion of the butt plate rearwardly in one direction and along a second line extending from the first line in a different direction to the back of the butt plate.

5. A felling head for a feller buncher, comprising:
a saw housing securable to a logging vehicle;
a disc saw blade mounted in the saw housing and having an exposed front portion in a severance area of the housing;
a motor mounted to the saw housing for turning the disc saw blade;
a butt plate, mounted to the saw housing over and having a severance portion that is generally parallel to the disc saw blade, wherein a sloped portion of the butt plate is angled upward relative to the severance portion to an outer edge of the butt plate to form an accumulation pocket including a portion that slopes over teeth of the disc saw blade for supporting accumulated trees on the sloping portion of the butt plate; and
a vertically-extending backplate provided along the sides of the accumulation pocket, wherein the accumulated trees are supported in the accumulation pocket on the sloping portion of the butt plate from an outer edge of a butt end of each tree.

6. The felling head as defined in claim 5, wherein the butt plate is angled along a line extending from a first point adjacent the teeth of the saw and offset from a center line in the machine direction to a second point on an internal edge of the butt plate adjacent the motor.

7. The felling head as defined in claim 5, wherein the upwardly sloping portion of the butt plate in the accumulation pocket slopes outwardly.

8. The felling head as defined in claim 5, wherein a portion of the accumulation pocket extends radially beyond the teeth of the saw blade, and a debris plate is coupled beneath the sloping accumulation pocket in the portion that extends radially beyond the teeth of the saw blade at an entry of the teeth into the saw housing to limit debris from entering the saw housing.

9. The felling head as defined in claim 8, wherein the debris plate has a surface that is sloped at the same angle as the sloping portion of the butt plate.

10. The felling head as defined in claim 8, wherein the debris plate extends over a portion of the saw blade, and has a channel over the teeth of the saw blade to provide clearance between the debris deflector and the teeth of the saw blade.

11. The felling head as defined in claim 5, further comprising a check plate between the saw blade and the housing to prevent deflection of the saw blade that would result in teeth of the saw blade impacting the housing.

12. The felling head as defined in claim 5, wherein the sloping portion of the butt plate is angled from an outer edge of the butt plate toward an inner edge of the butt plate.

13. The felling head as defined in claim 5, wherein the sloping portion of the butt plate is angled upward at an angle in the range of about fifteen to twenty degrees.

14. The felling head as defined in claim 5, wherein the sloping portion of the butt plate is angled along a line parallel to the machine direction.

15. The felling head as defined in claim 5, wherein the sloping portion of the butt plate is angled along a first line extending from a front portion of the butt plate substantially to a lateral center of the saw and along a second line extending from the lateral center to the back of the butt plate.

16. The felling head as defined in claim 5, wherein a direction of a line along which the sloping portion of the butt plate is angled is selected to direct the flow of chips and debris to exhaust the chips through the saw housing.

* * * * *